US008838574B2

(12) United States Patent
Anderson et al.

(10) Patent No.: US 8,838,574 B2
(45) Date of Patent: Sep. 16, 2014

(54) AUTONOMIC INDEX CREATION, MODIFICATION AND DELETION

(75) Inventors: Mark John Anderson, Oronoco, MN (US); Robert Joseph Bestgen, Rochester, MN (US); James Michael Flanagan, Rochester, MN (US); Scott Forstie, Rochester, MN (US); Thomas James Schreiber, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1260 days.

(21) Appl. No.: 11/423,233

(22) Filed: Jun. 9, 2006

(65) Prior Publication Data
US 2007/0294272 A1 Dec. 20, 2007

(51) Int. Cl.
G06F 7/00 (2006.01)
G06F 17/30 (2006.01)

(52) U.S. Cl.
CPC .... G06F 17/30336 (2013.01); G06F 17/30946 (2013.01); G06F 17/30312 (2013.01)
USPC ........................................................ 707/711

(58) Field of Classification Search
CPC .............................................. G06F 17/30946
USPC ................................................ 707/101, 711
See application file for complete search history.

(56) References Cited

U.S. PATENT DOCUMENTS

| 6,098,075 | A | 8/2000 | Becraft, Jr. et al. |
| 6,735,701 | B1 | 5/2004 | Jacobson |
| 6,775,676 | B1* | 8/2004 | Briam et al. ................... 707/101 |
| 6,928,432 | B2 | 8/2005 | Fagan et al. |
| 7,814,076 | B2 | 10/2010 | Sack et al. |
| 2002/0194205 | A1* | 12/2002 | Brown et al. ................. 707/200 |
| 2003/0088541 | A1 | 5/2003 | Zilio et al. |
| 2003/0088546 | A1 | 5/2003 | Brown et al. |
| 2003/0093408 | A1 | 5/2003 | Brown et al. |
| 2003/0200199 | A1 | 10/2003 | Snyder |
| 2003/0220915 | A1 | 11/2003 | Fagan et al. |
| 2004/0199530 | A1* | 10/2004 | Avadhanam et al. ......... 707/100 |
| 2005/0027702 | A1* | 2/2005 | Jensen et al. ...................... 707/3 |
| 2005/0086195 | A1* | 4/2005 | Tan et al. .......................... 707/1 |
| 2005/0160296 | A1 | 7/2005 | Maeno |
| 2005/0187917 | A1 | 8/2005 | Lawande et al. |

(Continued)

OTHER PUBLICATIONS

Products: Application Performance Management: Insure/INDEX, Apr. 18, 2005, http://www.centerfieldtechnology.com/tools/insureindex.asp.

(Continued)

*Primary Examiner* — Apu Mofiz
*Assistant Examiner* — Ajith Jacob
(74) *Attorney, Agent, or Firm* — Martin & Associates, LLC; Derek P. Martin

(57) ABSTRACT

An index advice record engine generates and stores index advice records. An index advice policy mechanism allows a user to define an index advice policy that specifies criteria for autonomic index creation, modification and deletion. An autonomic index mechanism reads the index advice records, compares this information with the criteria in the user-defined index advice policies, and determines whether an index should be created, modified or deleted based on the information in the index advice records and the index advice policies. By automating the process of creating, modifying and deleting indexes according to user-defined policies, the preferred embodiments alleviate human users from most of the work of manually creating, modifying and deleting indexes.

5 Claims, 11 Drawing Sheets

(56) References Cited

U.S. PATENT DOCUMENTS

| | | |
|---|---|---|
| 2005/0203940 A1 | 9/2005 | Farrar et al. |
| 2005/0229158 A1 | 10/2005 | Thusoo et al. |
| 2005/0234900 A1 | 10/2005 | Bossman et al. |
| 2006/0010168 A1 | 1/2006 | Lusen et al. |
| 2006/0101029 A1 | 5/2006 | Gordon |
| 2008/0294605 A1 | 11/2008 | Prahlad et al. |

OTHER PUBLICATIONS

DB2 Autonomic Computing: Index Advisor, Apr. 18, 2005, http://d25web1.torolab.ibm.com/function/dbt/SMART.nsf/0/2E944E6080C2036285256C5.

* cited by examiner

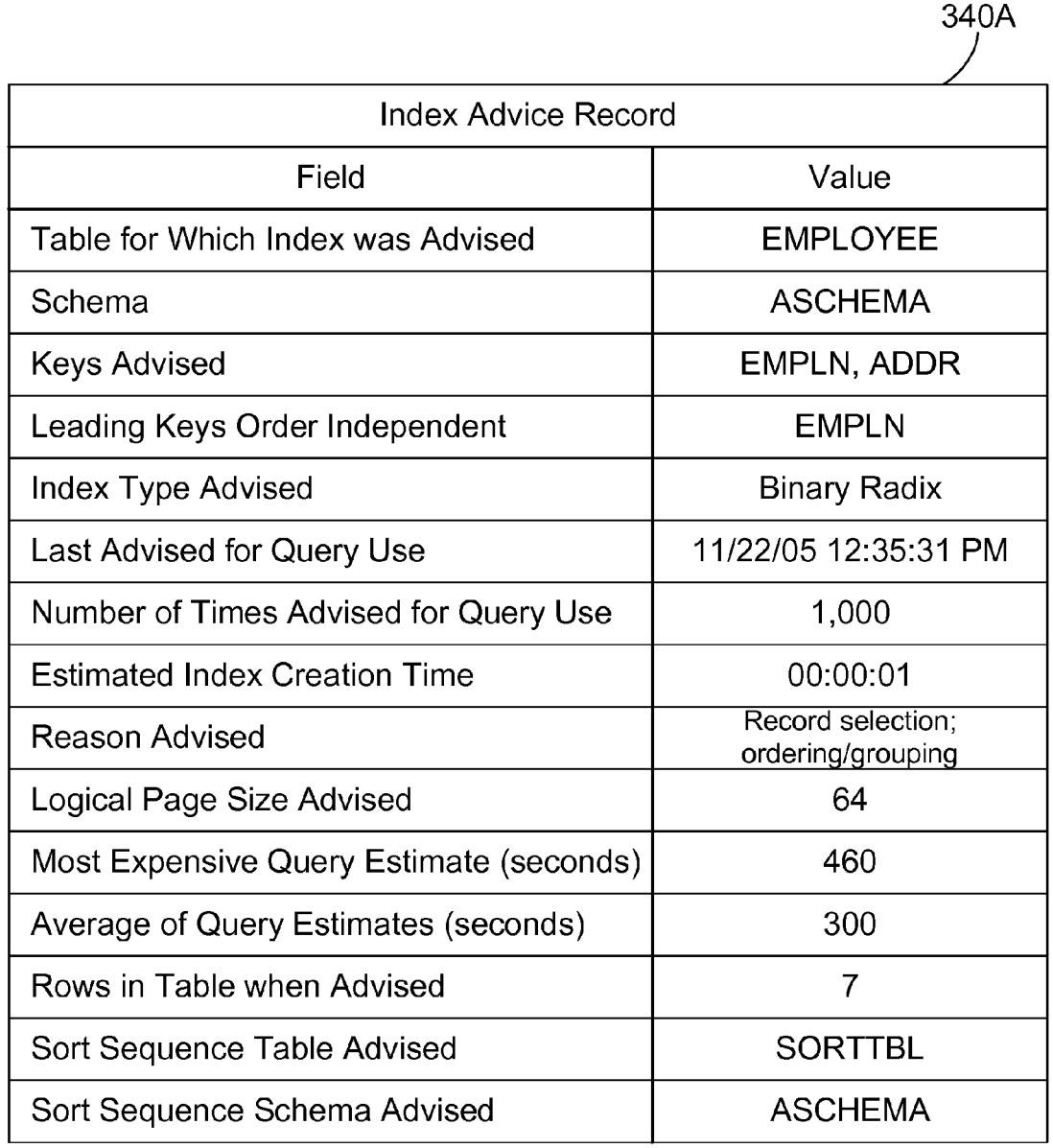

| Index Advice Record ||
| Field | Value |
|---|---|
| Table for Which Index was Advised | EMPLOYEE |
| Schema | ASCHEMA |
| Keys Advised | EMPLN, ADDR |
| Leading Keys Order Independent | EMPLN |
| Index Type Advised | Binary Radix |
| Last Advised for Query Use | 11/22/05 12:35:31 PM |
| Number of Times Advised for Query Use | 1,000 |
| Estimated Index Creation Time | 00:00:01 |
| Reason Advised | Record selection; ordering/grouping |
| Logical Page Size Advised | 64 |
| Most Expensive Query Estimate (seconds) | 460 |
| Average of Query Estimates (seconds) | 300 |
| Rows in Table when Advised | 7 |
| Sort Sequence Table Advised | SORTTBL |
| Sort Sequence Schema Advised | ASCHEMA |

FIG. 6    Prior Art

Existing Index  Keys  1010
[A][B][    ]

Advised Index  Keys  1020
[A][B][C][  ]

Modified Index  Keys  1030
[A][B][C][  ]

FIG. 10

| Policy | Expiration Date | Max Times to Act on Advice | Time Interval Between Acting on Advice | Time of Day to Act on Advice |
|---|---|---|---|---|
| My Policy | 05/15/06 | 5 | 4 hours | Night |
| D Policy | 6/30/06 | 15 | 1 hour | Morning |

AUTONOMIC INDEX CREATION, MODIFICATION AND DELETION

CROSS-REFERENCE TO RELATED APPLICATIONS

This patent application is related to a co-pending patent application entitled "Continual Generation of Index Advice", Ser. No. 11/239,617 filed on Sep. 29, 2005, and is also related to co-pending patent application entitled "Apparatus and Method for Autonomic Index Creation," Ser. No. 11/423,216 filed Jun. 9, 2006, and "Apparatus and Method for Autonomic Index Creation, Modification and Deletion", Ser. No. 11/423,226 filed Jun. 9, 2006. All three of these related patent applications are incorporated herein by reference.

BACKGROUND OF THE INVENTION

1. Field of the Invention

This invention generally relates to database systems, and more specifically relates to an apparatus and method for optimizing database performance using indexes.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and those records are returned as the query result.

Auxiliary data structures such as indexes may be built to speed the execution of a query. In the prior art, human users (such as system administrators, application programmers and database analysts) built indexes when the user determined that an index would speed the processing of a query, and deleted indexes when the user determined that the index was no longer useful. The decision of when to build an index, the characteristics of the index, and when to delete an index has been made by human users. Without a way to autonomically create, modify and delete indexes, the database industry will continue to suffer from inefficient, manual methods of managing indexes.

BRIEF SUMMARY OF THE INVENTION

According to the preferred embodiments, an index advice record engine generates and stores index advice records. An index advice policy mechanism allows a user to define an index advice policy that specifies criteria for autonomic index creation, modification and deletion. An autonomic index mechanism reads the index advice records, compares this information with the criteria in the user-defined index advice policies, and determines whether an index should be created, modified or deleted based on the information in the index advice records and the index advice policies. By automating the process of creating, modifying and deleting indexes according to user-defined policies, the preferred embodiments alleviate human users from most of the work of manually creating, modifying and deleting indexes.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The preferred embodiments of the present invention will hereinafter be described in conjunction with the appended drawings, where like designations denote like elements, and:

FIG. 6 is a prior art index advice record;

FIG. 10 is a block diagram showing how an existing index may be modified to provide an advised index in accordance with the preferred embodiments;

FIG. 11 is a block diagram of a table that may be used by the policy manager in FIG. 3 to allow further user control over the autonomic creation, modification and deletion of indexes by the autonomic index mechanism in FIGS. 1 and 3;

DETAILED DESCRIPTION OF THE INVENTION

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. For example, lets assume there is a database for a company that includes a table of employees, with columns in the table that represent the name, address, phone number, gender, and salary of each employee. With data stored in this format, a query could be formulated that would retrieve the records for all female employees that have a salary greater than $40,000. Similarly, a query could be formulated that would retrieve the records for all employees that have a particular area code or telephone prefix.

Sometimes it is helpful to build an index to access data in a database table. An index typically has a primary key whose value determines the order of records in the index. Thus, if the employee table referenced above included a field for an employee's age, an index over the age field would reference all of the records in the table in an order determined by the age of the employee. Let's assume the age index is ordered from lowest to highest age. If a query looks for employees that are more than some specified age, using the index over the age column would be a very efficient way to process the query.

The first page of this patent application references a related application entitled "Continual Generation of Index Advice." The present invention builds upon the concepts in this related application. For this reason, a brief overview is now provided for the related application.

Figure 2:
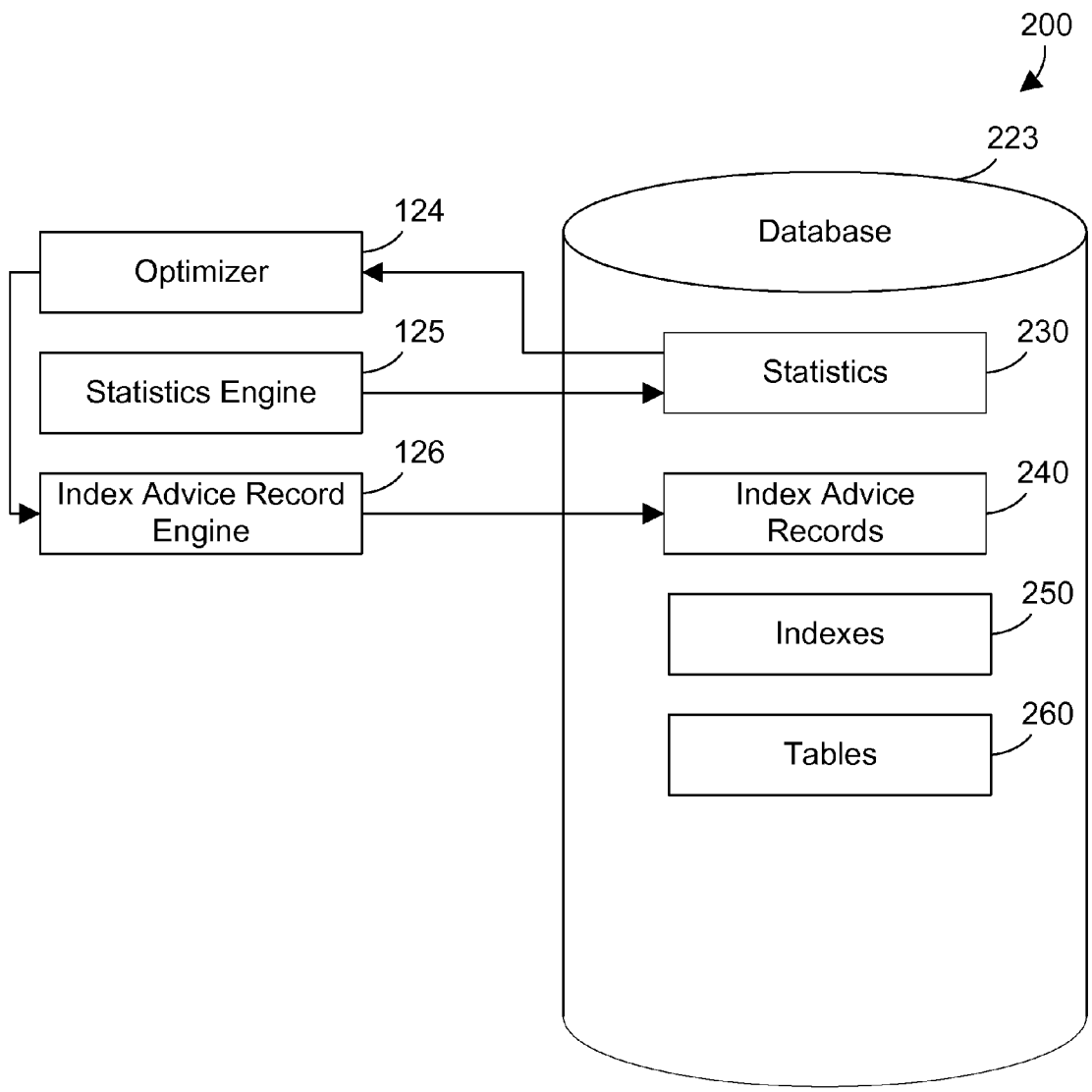
FIG. 2 is a block diagram of a sample prior art database system.

Referring to FIG. 2, a prior art database system 200 includes a database 223 that includes statistics 230, index advice records 240, one or more indexes 250, and tables 260. A statistics engine 125 collects statistics regarding the run-time performance of the database, and stores these as statistics 230. The statistics 230 are used by the optimizer 124 in generating access plans for executing queries. An index advice record engine 126 generates index advice records 240. These index advice records 240 provide information to a user of the database (such as a system administrator, application programmer, or database analyst) regarding monitored activity of the database 223, and provides advice to the user regarding the desirability of certain indexes. By providing an index advice record engine 126 that is part of the prior art database system 200, the database system itself includes information that helps a user determine when to build indexes.

Figure 4:
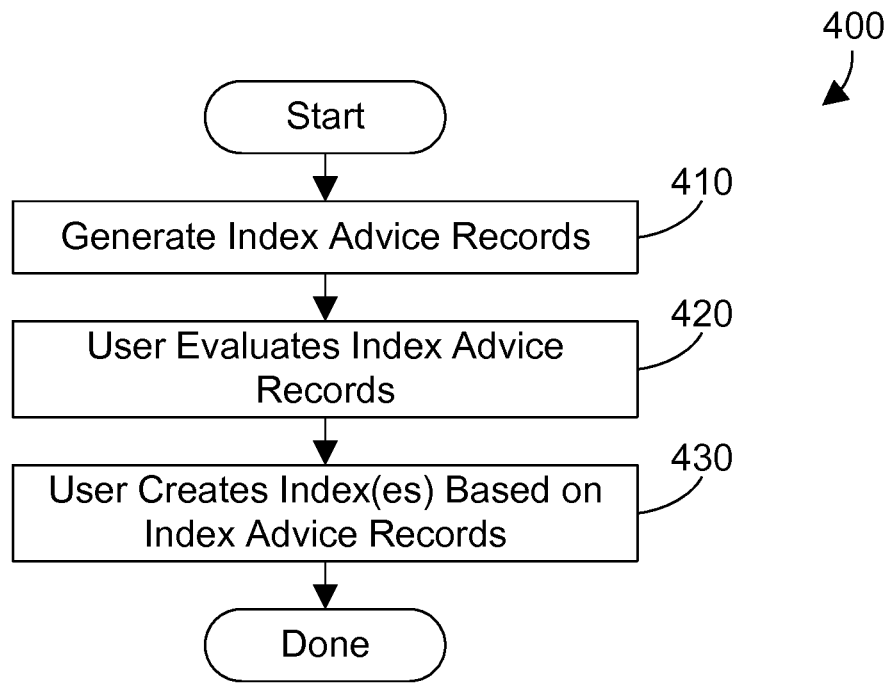
FIG. 4 is a flow diagram of a prior art method for creating database indexes.

Referring to FIG. 4, a prior art method 400 for creating indexes 250 according to the related application entitled "Continual Generation of Index Advice" begins by generating index advice records (step 410). Once index advice records have been generated, a user may then evaluate the index advice records (step 420), and create one or more indexes 250 based on the index advice records (step 430). Note that the evaluation of the index advice records and the creation of the corresponding indexes are done manually by the user.

The preferred embodiments provide a significant enhancement to the index advice records in the related application by allowing a user to define one or more index advice policies, and by allowing an autonomic index mechanism to make decisions autonomically regarding index creation, modification and deletion based on the monitored database activity indicated in the index advice records and based on the user-defined index advice policies. By automating the process of index creation, modification and deletion within the database system itself, the preferred embodiments provide a significant enhancement to the performance of the database system and significantly reduce the time users must spend managing indexes.

Figure 1:
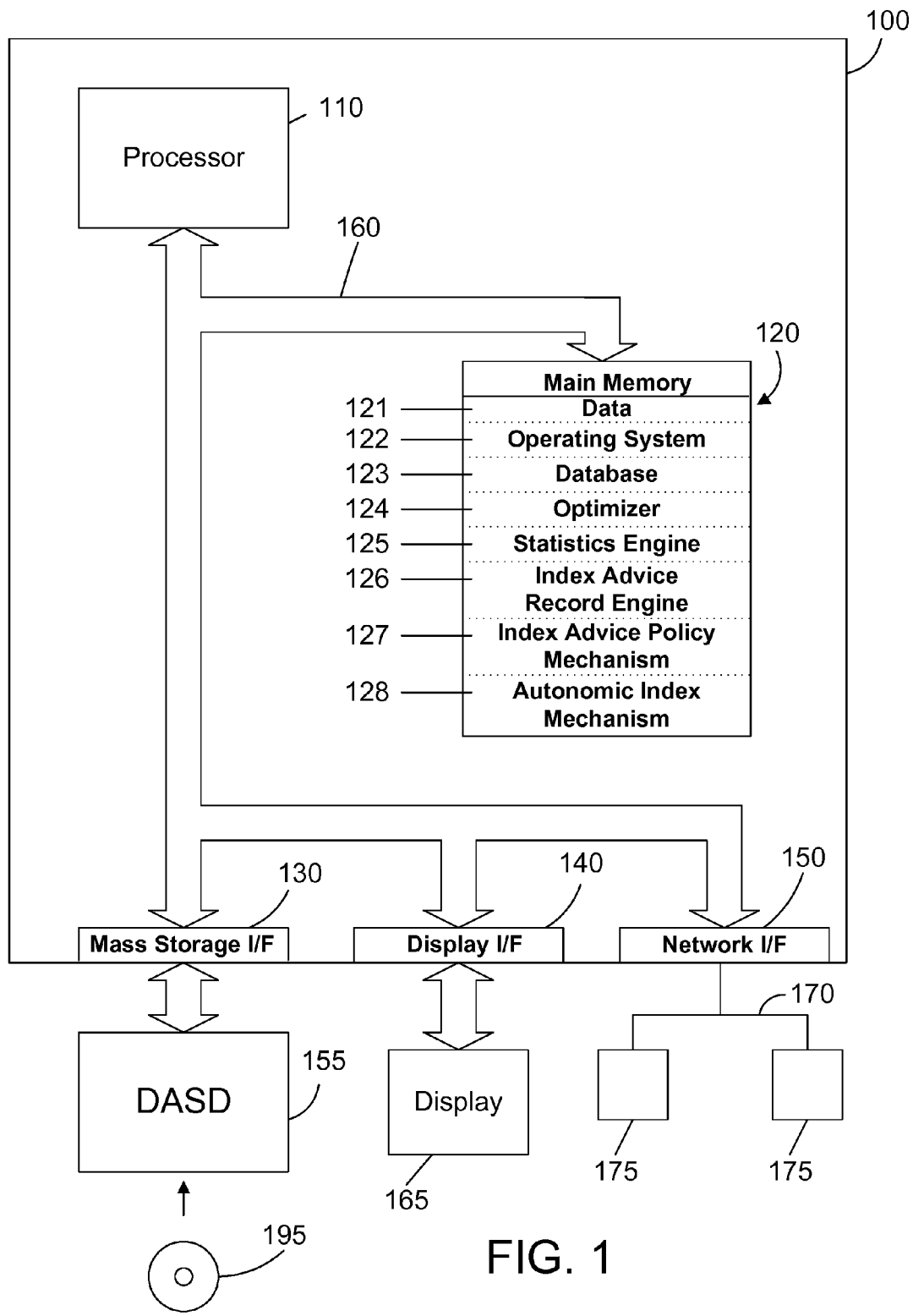
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 in accordance with the preferred embodiments contains data 121, an operating system 122, a database 123, an optimizer 124, a statistics engine 125, an index advice record engine 126, an index advice policy mechanism 127, and an autonomic index mechanism 128. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system. Database 123 is any suitable database, whether currently known or developed in the future. Optimizer 124 is a query optimizer that optimizes the performance of queries by generating an access plan for the query that is estimated to provide the best performance for the query. The statistics engine 125 collects run-time statistics regarding database performance, such as the time for executing queries, frequent value lists, histogram, and cardinality. The index advice record engine 126 is described in the related application entitled "Continual Generation of Index Advice," and generates index advice records according to information received from the query optimizer 124. The index advice policy mechanism 127 allows a user to define one or more index advice policies that specify criteria that govern the creation, modification and deletion of indexes. The autonomic index mechanism 128 reads the information in the index advice records, reads the information in the index advisor policies, then determines when to autonomically create, modify or delete an index based on the information read from the index advice records and the index advisor policies. The function of the index advice record engine 126, the index advice policy mechanism 127, and the autonomic index mechanism 128 is discussed in more detail below with reference to FIGS. 3, 5 and 7-12.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, query optimizer 124, statistics engine 125, index advice record engine 126, index advice policy mechanism 127, and autonomic index mechanism 128 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiments each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable media used to actually carry out the distribution. Examples of suitable computer-readable media include: recordable media such as floppy disks and CD-RW (e.g., 195 of FIG. 1), and transmission media such as digital and analog communications links.

Figure 3:
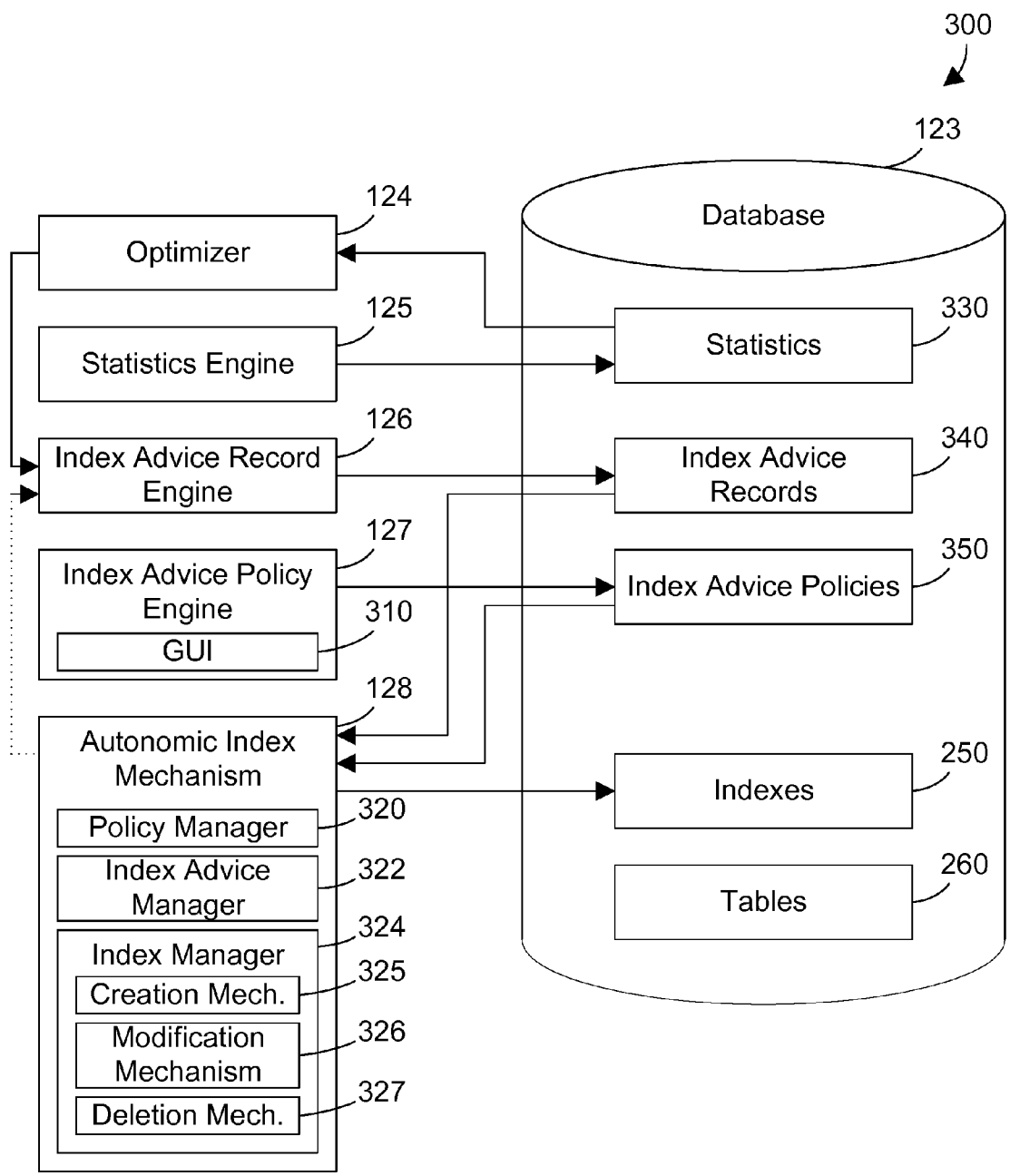
FIG. 3 is a block diagram of a sample database system in accordance with the preferred embodiments.

Referring to FIG. 3, a database system 300 in accordance with the preferred embodiments is a logical view of some of the items in computer system 100 in FIG. 1. Database system 300 includes an optimizer 124, statistics engine 125, and index advice record engine 126 that are preferably the same as those shown in the prior art database system 200 in FIG. 2. The index advice record engine 126 creates index advice records 340 based on monitored database activity. Note that index advice records 340 may be the same as prior art index advice records 240 in FIG. 2, or may have a different format. In the prior art system 200 shown in FIG. 2, a user then had to view the index advice records 240 and decide which indexes 250 to build based on the advice, the characteristics of the indexes, and when to manually create them, modify them, or delete them.

In database system 300 shown in FIG. 3, an index advice policy engine 127 allows a user to define one or more index advice policies 350. The index advice policy engine 127 preferably includes a graphical user interface 310 that simplifies the task of the user defining the index advice policies 350. An index advice policy 350 preferably includes criteria (i.e., one or more conditions) that must be satisfied for an index to be autonomically created, modified or deleted by the autonomic index mechanism 128. The GUI 310 may include a wizard that queries the user for the information needed to define an index advice policy. The autonomic index mechanism 128 reads the index advice records 340, reads the criteria in the index advice policies 350, and determines whether the monitored database activity in the index advice records 340 satisfies the criteria specified in one or more of the index advice policies 350 for creation, modification or deletion of an index. If the criteria for autonomically creating, modifying or deleting an index specified in an index advice policy is satisfied, an index 250 is created, modified or deleted autonomically by the autonomic index mechanism 128.

Figure 5:
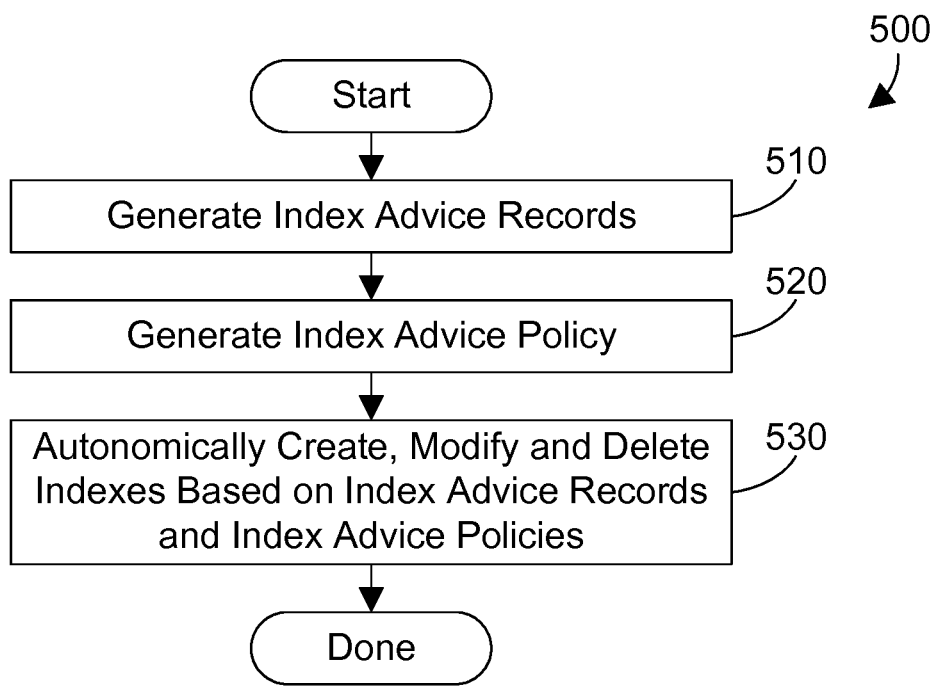
FIG. 5 is a flow diagram of a method for autonomically creating, modifying and deleting indexes in accordance with the preferred embodiments.

A method 500 in accordance with the preferred embodiments is shown in FIG. 5. First, index advice records 340 are generated (step 510). One or more index advice policies 350 are also generated by a user (step 520), preferably using GUI 310 in FIG. 3. One or more indexes 250 may then be autonomically created, modified or deleted based on the index advice records 340 and index advice policies 350 (step 530). Method 500 automates the process of creating, modifying and deleting indexes by allowing a user to specify criteria for creating, modifying and deleting an index in an index advice policy, which then allows the autonomic index mechanism 128 to autonomically create, modify or delete an index when the monitored database activity in the index advice records satisfies criteria in one or more index advice policies.

One specific example of an index advice record is shown as 340A in FIG. 6. An index advice record 340 in FIG. 3 may include any suitable information that relates to database conditions or activity. For the specific example 340A in FIG. 6, the index advice records includes the following fields: Table for Which Index was Advised; Schema; Keys Advised; Leading Keys Order Independent; Index Type Advised; Last Advised for Query Use; Number of Times Advised for Query Use; Estimated Index Creation Time; Reason Advised; Logical Page Size Advised; Most Expensive Query Estimate; Average of Query Estimates; Rows in Table when Advised; Sort Sequence Table Advised; and Sort Sequence Schema Advised. The field Table for Which Index was Advised indicates a table name for which an index was advised. For the sample record 340A in FIG. 6, the table is EMPLOYEE. The field Schema indicates the name of a schema for the EMPLOYEE table. For the sample record 340A, the schema is called ASCHEMA. The field Keys Advised shows the keys for the advised index. For the sample record 340A, the keys advised are EMPLN and ADDR, which correspond to the employee number and address, respectively.

The field Leading Keys Order Independent shows the subset list of key columns which can be safely reordered and still have an index that satisfies the needs for the query. The full advised key list shows all the keys requested for the index. The Leading Keys Order Independent list allows user the flexibility to make fewer indexes to cover more conditions. For the sample record 340A, having a single leading key order independent, such as EMPLN, is the same as having no leading order independent keys. This field begins to have meaning when there are two or more keys listed as leading order independent keys. For example, if EMPLN, ADDR has been shown in the Leading Keys Order Independent field, a valid index creation to match the advice would be either EMPLN, ADDR or ADDR, EMPLN. When specified as leading order independent, the database has declared that a permanent index with either order would qualify as matching the advice and hence would then be used for subsequent queries.

The field Index Type Advised indicates the type of index that this record 340A advises, namely a binary radix index. The field Last Advised for Query Use contains the date and time the index was last advised due to running a query. For the sample record 340A, a query last advised the index on Nov. 22, 2005 at 12:35:31 PM. The field Number of Times Advised for Query Use keeps a running total of the number of times an index was advised due to running one or more queries. For the sample record 340A, the index has been advised during 1,000 different executions of queries. The field Estimated Index Creation Time specifies how long it is estimated to take to create the index, namely 0.01 seconds for the sample record 340A. The field Reason Advised specifies the reasons for advising the index. For the sample record 340A, there are two reasons, namely record selection and ordering/grouping. Record selection occurs when a WHERE clause is used to limit the number of records selected. Ordering occurs when the ORDER BY clause is used to return the records in a specified order. Grouping occurs when the GROUP BY clause is used to logically group the selected records by some criteria. The field Logical Page Size Advised indicates the size of a logical page for the advised index, namely 64 Kbytes for the sample record 340A. Indexes with larger logical page sizes are typically more efficient when scanned during query processing. Indexes with smaller logical page sizes are typically more efficient for simple index probes and individual key lookups. Note that if an encoded vector index is specified, specifying Page Size Advised is not allowed.

The field Most Expensive Query Estimate indicates the time, in seconds, to execute the most expensive query, which is the query that takes longest to execute. For the sample record 340A, the most expensive query is estimated to run in 460 seconds. The field Average of Query Estimates indicates the time, in seconds, of the query estimates that advise the index. For the sample record 340A, the average of query estimates is 300 seconds. The field Rows in Table when Advised indicates the number of rows that were in the EMPLOYEE table when the index was advised, namely seven, which is the number of rows in the EMPLOYEE table the last time the index was advised.

The field Sort Sequence Table Advised indicates a sort sequence table for the corresponding table. Thus, for the specific example in FIG. 6, the sort sequence table SORTTBL is that sort sequence table that corresponds to the EMPLOYEE table. A sort sequence table is an object that contains the weight of each single-byte graphic character within a specified coded character set identifier (CCSID).

Depending on the requirements, a table may be defined to have either a unique weight for each graphic character or shared weights for some graphic characters. If a table contains unique weights for each character within the character set, the table is known as a unique-weight table. If a table contains some graphic characters that share the same weight, the table is known as a shared-weight table. For example, to sort the graphic character capital letter A and the graphic character small letter a together, a shared-weight table may be defined that shares indicates both capital and small letter A have a shared weight. If you want to sort these graphic characters separately, a unique-weight table could be defined.

Before using an existing index, the database ensures the attributes of the columns (selection, join, or grouping columns) match the attributes of the key columns in the existing index. The sort sequence table is an additional attribute that must be compared. The sort sequence table associated with the table must match the sort sequence table with which the existing index was built. The database compares the sort sequence tables. If they do not match, the existing index cannot be used. Unless the optimizer chooses to do a sort to satisfy the ordering request, the sort sequence table associated with the index must match the sort sequence table associated with the query. When a sort is used, the translation is done during the sort. Since the sort is handling the sort sequence requirement, this allows DB2 Universal Database for iSeries to use any existing index that meets the selection criteria.

The field Sort Sequence Schema Advised indicates the name of a schema that corresponds to the advised sequence sort table in the previous field. For the specific example in FIG. 6, the schema ASCHEMA is specified as the schema that corresponds to the sort sequence table SORTTBL in the previous field.

While one individual index advice record 340A is shown in FIG. 6, the index advise records 340 in FIG. 3 may include a large number of index advise records for many different tables based on many different queries. Index advise records 340 preferably include index advice for the entire database system. Note, however, that index advice records 340 could also be logically or physically divided into different sets of records based on any suitable criteria within the scope of the preferred embodiments.

Figure 7:
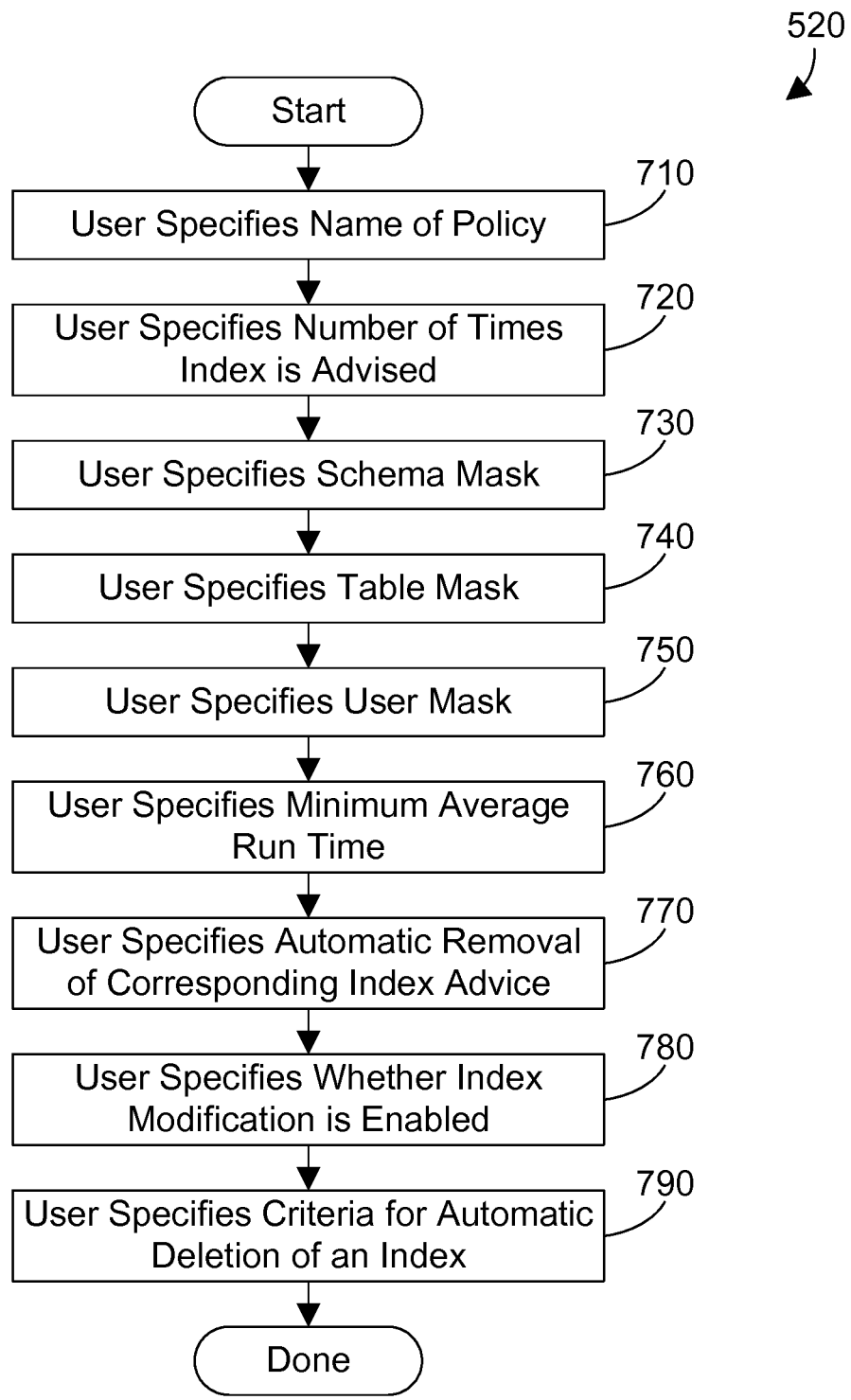
FIG. 7 is a flow diagram of one specific implementation of step 520 in FIG. 5 in accordance with the preferred embodiments.

Referring to FIG. 7, a method 520 represents one suitable implementation for step 520 in FIG. 5 within the scope of the preferred embodiments. Method 520 is preferably performed by the index advise policy mechanism 127 in FIGS. 1 and 3 to allow a user to define an index advice policy 350. First, the user specifies the name of the policy (step 710). The user may specify the number of times an index is advised (step 720). The number of times an index was advised in index advice records is compared against the threshold number defined in step 720, and when the number of times an index was advised in index advice records meets or exceeds this threshold number, the criteria defined by the user in step 720 is satisfied. The user may also specify a schema mask (step 730). This mask may be inclusive or exclusive, meaning it may indicate which schemas to include or exclude from consideration. The user may also specify a table mask (step 740). This mask also may be inclusive or exclusive, meaning it may indicate which tables to include or exclude from consideration. The user may also specify a user mask (step 750). This mask also may be inclusive or exclusive, meaning it may indicate which users to include or exclude from consideration.

The user may also specify a minimum average run time for a query (step 760). This is a time threshold specified by the user that is a criteria for index creation. When the average of query estimates in an index advice record exceeds this user-defined threshold, this criteria in the index advice policy is satisfied, which may trigger autonomic creation of the index. The user may also specify whether or not to automatically remove corresponding index advice when an index is autonomically created (step 770). This allows the index advice to be updated by removing records that no longer apply because an advised index has been autonomically created. The user may also specify whether index modification is enabled (step 780). When index modification is enabled, an existing index may be modified to satisfy more than one query. The user may also specify criteria for automatic deletion of an index (step 790).

Note that the steps 710-790 in FIG. 7 need not all be performed. Some of these steps are optional, and others could be performed automatically. In the alternative, default values could be provided that a user could then alter. In addition, some or all of the information in an index advice policy may be generated by a wizard prompting a user for input. The preferred embodiments expressly extend to any suitable way for a user to define a policy that includes criteria for determining when to autonomically create, modify or delete indexes.

Figure 8:
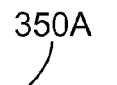
FIG. 8 is a sample index advice policy in accordance with the preferred embodiments.

Referring to FIG. 8, a sample index advice policy 350A is shown. This policy has a name My Policy. The Number of Times Advised indicates the threshold for when autonomic creation of an index will be considered. With a value of 1,000 as shown in FIG. 8, the policy specifies that an index be autonomically created only if the index is advised 1,000 times or more. A Schema Mask, defined as an exclude mask, is provided with a value DEVELOP*. The "*" at the end of DEVELOP* is a wildcard that specifies to include any schema that has the root name of DEVELOP. This means that any index advice record that specifies a schema with a root name of DEVELOP will be excluded from consideration. A Table Mask, defined as an include mask, is provided with a value CUST*. This means that only index advice records that pertain to a table with a root name of CUST will be included. A User Mask, defined as an exclude mask, is provided with a value TEST*. This means that any index advise records generated by any user with a root name of TEST will be excluded. This allows the database performance of test users to be ignored in determining when to autonomically create indexes.

The Average Query Run Time is specified as 5 seconds, which is a time threshold. When the average query run time in the index advice records meets or exceeds this threshold, the index may be autonomically created. For the specific index advice policy 350A shown in FIG. 8, we assume the autonomic index mechanism will create the index when both the number of times advised is equal or greater than 1,000 AND when the average query run time is equal to or greater than 5 seconds. Note, however, that the autonomic index mechanism could also decide to create the advised index when either the number of times advised is equal or greater than 1,000 OR when the average query run time is equal to or greater than 5 seconds. This demonstrates the flexibility of defining a policy separate from an autonomic index mechanism that creates an index based on the policy.

The Remove Advised Index from Index Advice flag is set to Yes, which means that autonomic creation of the index will cause autonomic removal of the corresponding index advice records. The corresponding index advice records could be removed in two ways, by either removing a specific row of index advice, or by removing all index advice for this schema/table pair. The Index Modification Enabled flag is set to Yes, which means the autonomic index mechanism 128 may modify an existing index to generate an advised index or an index that will provide the functionality of the advised index.

The next three entries in the index advice policy 340A in FIG. 8 relate to autonomic deletion of indexes. The field Delete Advised Index if Unused has a value of 24 hours, which means an index will be autonomically deleted if it is unused for 24 hours. The Override Autonomic Deletion of Index Based on Time is set to No, which means the autonomic deletion of an index based on the 24 hour value will be performed. Note that putting a Yes value for this override field would cause the index to not be autonomically deleted. The Override Autonomic Deletion of Index Based on Storage Policy is a flag that is set to No. The autonomic index mechanism 128 may optionally include the ability to autonomically delete indexes based on a storage policy. Thus, autonomic deletion of indexes may be performed more aggressively when there is limited storage in the database to create more room in the database. By setting this flag to No, the autonomic index mechanism 128 can autonomically delete indexes based on storage policy. If this flag were set to Yes, the autonomic deletion of indexes based on storage policy would be overridden (i.e., disabled).

The last entry in the index advice policy 340A in FIG. 8 relates to a way to disable the autonomic creation and deletion of indexes when the table is frequently updated. The field Override Autonomic Creation/Modification/Deletion of Index based on Table Record Change Frequency allows the user to specify that autonomic creation, modification or deletion of an index may be overridden if the table record change frequency, i.e., the rate of insertions and deletions into the table, is too high. If the table record change frequency is too high, the cost of maintaining the index may be excessive and the index should be deleted (or not be created) until the table record change frequency is reduced. With a value of No for this field as shown in FIG. 8, the autonomic index mechanism 127 will autonomically create and delete indexes regardless of the record change frequency.

Figure 9:
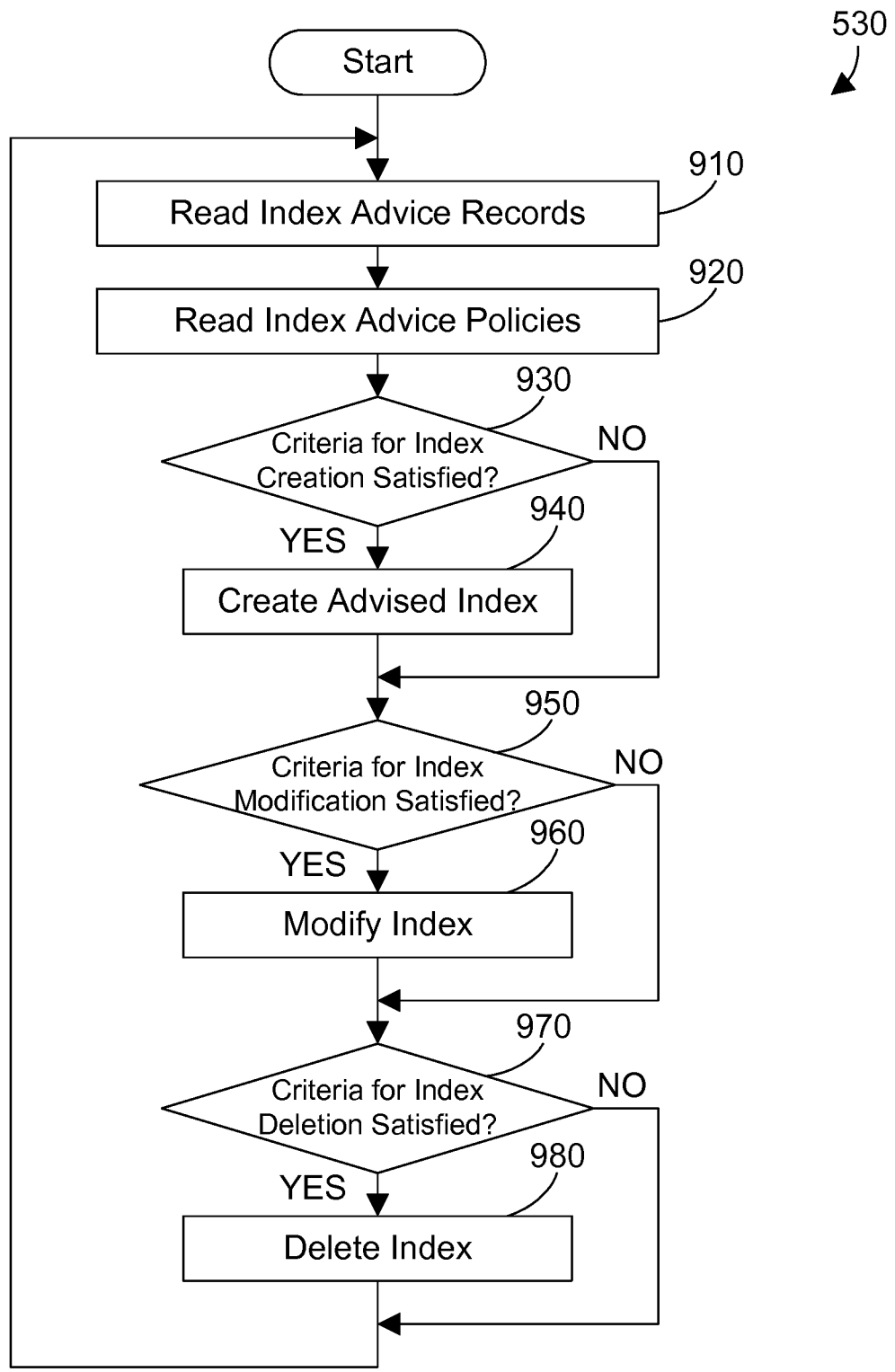
FIG. 9 is a flow diagram of one specific implementation of step 530 in FIG. 5 in accordance with the preferred embodiments.

Referring to FIG. 9, a method 530 represents one specific implementation of step 530 in FIG. 5 within the scope of the preferred embodiments. Method 530 is preferably performed by the autonomic index mechanism 128 shown in FIGS. 1 and 3. First, the index advice records are read (step 910). The index advice policies are also read (step 920). The data in the index advice records is then processed to determine whether criteria for index creation in the index advice policies are satisfied (step 930). If so (step 930=YES), an index is autonomically created (step 940). If not (step 930=NO), no index is created. Method 530 then checks to see if criteria for index modification are satisfied (step 950). If so (step 950=YES), an index is autonomically modified (step 960). If not (step 950=NO), no index is modified. Method 530 then checks to see if criteria for index deletion are satisfied (step 970). If so (step 970=YES), the index is autonomically deleted (step 980). If not (step 970=NO), no index is deleted. Method 530 then loops back to step 910 and continues.

An example is now provided to illustrate autonomic index modification of the preferred embodiments. Referring to FIG. 10, we assume an existing index 1010 has keys A and B. We further assume that the index advice records advise an index 1020 that has keys A, B and C. The autonomic index mechanism 128 can determine that an existing index 1010 already exists with two of the three keys, and instead of creating a new index, can decide instead to modify the existing index 1010 to create a modified index 1030 with the advised three keys. In this manner, the autonomic index mechanism 128 includes intelligence to determine whether modification of an index is a more desirable solution than creation of a new index. Note that autonomic index mechanism 128 will autonomically modify an index only if the Index Modification Enabled flag in the index advice policy shown in FIG. 8 is set to Yes, indicating that autonomic index modification is enabled.

The autonomic index mechanism 128 shown in FIG. 3 includes a policy manager 320. The policy manager 320 provides additional user control over the function of the autonomic index mechanism 128. The policy manager may receive input from a user that introduces additional criteria that must be satisfied for autonomic index creation, modification or deletion. One example of suitable criteria for the policy manager 320 in FIG. 3 is shown in the table 1100 in FIG. 11. Table 1100 lists policies and corresponding criteria for using the policies. The first entry in the table is for the policy My Policy 350A shown in FIG. 8. The Expiration Date field allows the user to specify an expiration date for the policy. This allows the user to specify a date after which the policy will not be used. The Max Times to Act on Advice field specifies the maximum number of time an index may be created based on advice in index advice records. The field Time Interval Between Acting on Advice specifies a minimum time between autonomic index creation based on the advice. For My Policy, the time interval between acting on advice is 4 hours, which means the advised index can only be created once every four hours. The field Time of Day to Act on Advice specifies a suitable time period during which the autonomic index mechanism 128 may act on the advice. For the example in table 1100 in FIG. 11, the time of day is specified as night, morning, afternoon, etc. Each of these terms could be defined to corresponding to a specific time period. In other words, Night could be defined to be from 10:00 PM to 6:00 AM. Of course, the Time of Day to Act on Advice could allow a user to specify a specific time period as well. One skilled in the art will realize that any suitable time period could be defined in any suitable way for the Time of Day to Act on Advice field.

Providing the policy manager 320 in FIG. 3 that acts according to additional criteria, such as that shown in table 1100 in FIG. 11, gives the user another level of control over the autonomic index manager 128. One skilled in the art will realize that any suitable criteria could be defined for the policy manager 320 that controls when an index advice policy may be used or acted upon.

A potential problem could occur with the autonomic index mechanism 128. Let's assume index advice records advise the creation of an index we'll call Index A. We assume the criteria in an index policy is satisfied by the monitored database activity in the index advice records, thereby causing the autonomic index mechanism 128 to autonomically create Index A. Now let's assume that Index A, even though it was advised, proves not to be terribly beneficial. As a result, the index could be autonomically deleted. However, if the index advice records are still advising creation of Index A, as soon as the autonomic index mechanism 128 detects that Index A is advised but not present, it will once again autonomically create Index A. The result is significant overhead in autonomically creating an index, only to delete it later, followed by re-creating it, etc. What is needed is a way to control the autonomic creation of the index to avoid this situation. One type of control is to place additional criteria for using the index advice policy, as shown in table 1100 in FIG. 11. Another type of control is to allow the autonomic index mechanism to check to see if the index has been created before, and to not create the index if it was created before and if it was not beneficial. This logic could be implemented within the autonomic index mechanism 128 using method 1200 in FIG. 12. If the advised index has not been created in the past (step 1210=NO), the index is autonomically created (step 1230), and method 1200 is done. If the advised index has been created in the past (step 1210=YES), method 1200 then checks to see if the previous creation of the advised index was beneficial (step 1220). If so (step 1220=YES), the advised index is autonomically created (step 1230). If not (step 1220=NO), the advised index is not created (step 1240), and the index advice records that advise the index are removed (step 1250). By removing the index advice records in step 1250 that advise creation of the index, the autonomic index mechanism will not create and index based on old index advice records that advise an index that was just deleted.

Figure 13:
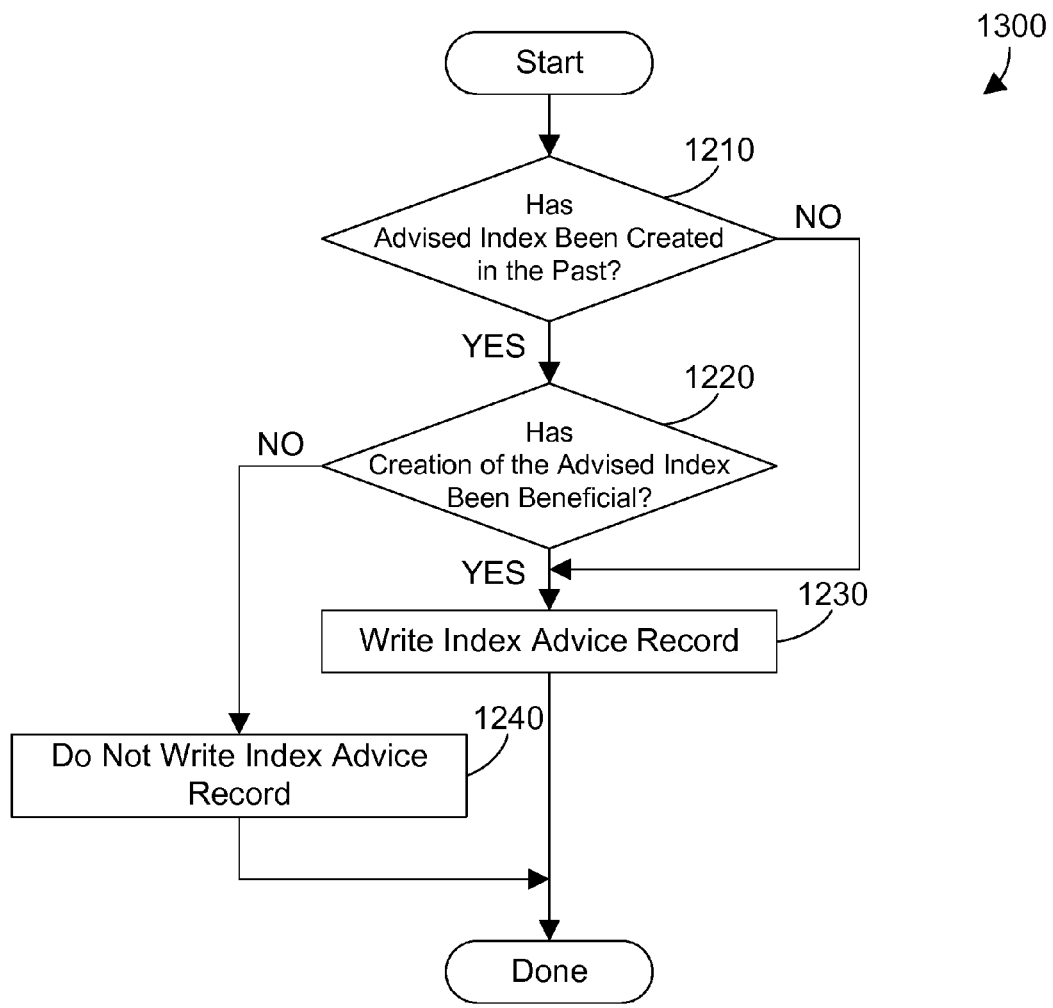
FIG. 13 is a flow diagram of a method performed by the index advice record mechanism in FIGS. 1 and 3 according to a second specific embodiment.

An alternative way to help the problem of autonomically creating an index that was not very beneficial in the past is to build more intelligence into the index advice record engine 126 in FIGS. 1 and 3 as shown by the dotted line from the autonomic index mechanism 128 to the index advice record engine 126 in FIG. 3. Referring to FIG. 13, a method 1300 shows the steps the index advice record engine 126 performs before writing an index advice record. If the advised index has not been created in the past (step 1210=NO), the index advice records is written (step 1230), and method 1300 is done. If the advised index has been created in the past (step 1210=YES), method 1300 then checks to see if the previous creation of the advised index was beneficial (step 1220). If so (step 1220=YES), the index advice records is written (step 1230). If not (step 1220=NO), the index advice record that advises the creation of the index is not written (step 1240). Method 1300 helps the index advice record engine 126 to determine when an index advice record is not beneficial, and therefore prevents writing the index advice record if the index advice has not been helpful in the past.

Figure 12:
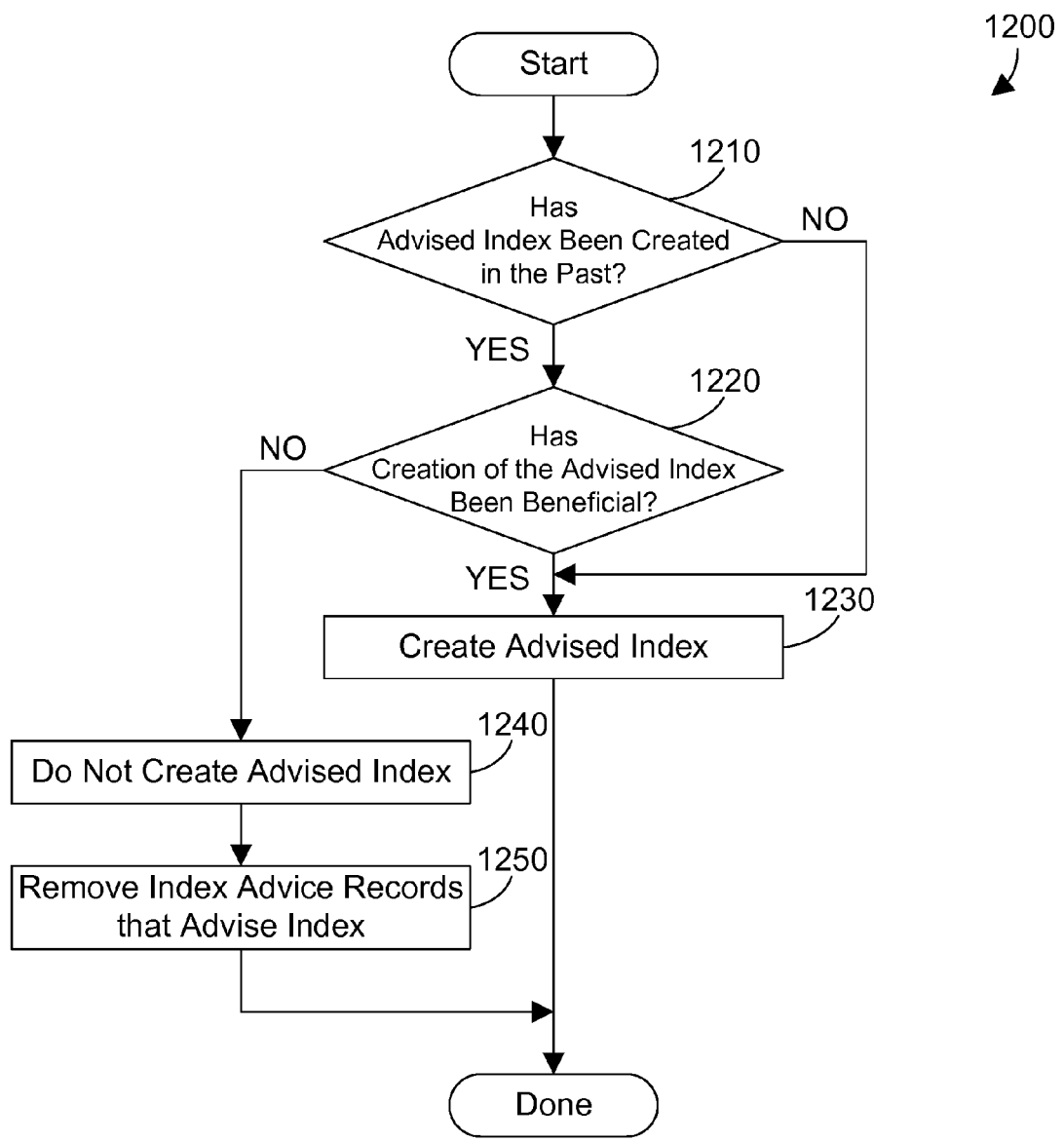
FIG. 12 is a flow diagram of a method performed by the autonomic index mechanism in FIGS. 1 and 3 according to a first specific embodiment.

Methods 1200 and 1300 in FIGS. 12 and 13, respectively, illustrate a simple case where an index is not created if it was previously created and was not beneficial. Note, however, that a less severe heuristic could be implemented in methods 1200 and 1300. For example, instead of disabling index creation because it was not beneficial in the past, the autonomic index mechanism 127 could simply wait a longer time before creating the index. In the alternative, the autonomic index mechanism 127 may attempt to create the advised index more closely to when the index was advised to enhance the probability of the index being useful. The preferred embodiments extend to any suitable way for the autonomic index mechanism 127 to decide whether or not to autonomically create, modify or delete an index.

The preferred embodiments allow a user to define one or more index advice policies that define criteria for autonomically creating, modifying and deleting indexes. An autonomic index mechanism processes index advice records, determines whether the data in the index advise records satisfies criteria for autonomically creating, modifying or deleting indexes specified in the user-defined policies, then autonomically creates, modifies or deletes indexes accordingly. By autonomically creating, modifying and deleting indexes, users such as system administrators, application programmers, and database analysts may be relieved of much of the manual work of creating, modifying and deleting indexes to improve database query performance.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A computer-implemented method for autonomically modifying an index for a database, the method comprising the steps of:
generating a user-defined index policy that specifies criteria for modification of the index to satisfy a plurality of different queries;
generating a plurality of index advice records that comprise monitored activity of the database, wherein each index advice record specifies a time an index was last advised during query execution and a number of times the index has been advised during query execution;
reading the plurality of index advice records; and
determining whether information in the plurality of index advice records satisfies the criteria for modification of the index in the user-defined index policy, and if so, autonomically modifying the index to satisfy the plurality of different queries.

2. The method of claim 1 wherein the user-defined index policy further specifies criteria for deleting the index, the method further comprising the step of autonomically deleting the index when the criteria for deleting the index is satisfied by the monitored activity.

3. The method of claim 1 further comprising the step of allowing a user to define criteria for using the user-defined index policy.

4. The method of claim 1 wherein the user-defined index policy further specifies criteria for creation of a selected index in the database, the method further comprising the steps of determining whether the selected index was autonomically created in the past, and if so, determining whether the selected index was beneficial in the past, and if not, not creating the selected index.

5. The method of claim 4 further comprising the step of deleting at least one index advice record that advised creation of the selected index if the selected index was not beneficial in the past.

* * * * *